(12) United States Patent
Estkowski et al.

(10) Patent No.: US 8,060,295 B2
(45) Date of Patent: Nov. 15, 2011

(54) AUTOMATED SEPARATION MANAGER

(75) Inventors: Regina I. Estkowski, Bellevue, WA (US); Ted D. Whitley, Lopez Island, WA (US); Richard Baumeister, Aurora, CO (US)

(73) Assignee: The Boeing Company, Chicago, IL (US)

( * ) Notice: Subject to any disclaimer, the term of this patent is extended or adjusted under 35 U.S.C. 154(b) by 1014 days.

(21) Appl. No.: 11/938,377

(22) Filed: Nov. 12, 2007

(65) Prior Publication Data

US 2009/0125221 A1    May 14, 2009

(51) Int. Cl.
*G06G 7/76* (2006.01)
(52) U.S. Cl. ......................................... 701/120; 340/961
(58) Field of Classification Search .................. 701/120, 701/300–302, 211, 214, 3; 340/961
See application file for complete search history.

(56) References Cited

U.S. PATENT DOCUMENTS

| | | | |
|---|---|---|---|
| 2,560,265 A | 7/1951 | Adler | |
| 3,843,982 A | 10/1974 | Lane et al. | |
| 4,402,479 A | 9/1983 | Phipps, III et al. | |
| 4,839,658 A | 6/1989 | Kathol et al. | |
| 5,058,024 A | 10/1991 | Inselberg | |
| 5,381,140 A | 1/1995 | Kuroda et al. | |
| 5,566,074 A | 10/1996 | Hammer | |
| 5,627,546 A | 5/1997 | Crow | |
| 6,085,147 A | 7/2000 | Myers | |
| 6,393,358 B1 | 5/2002 | Erzberger et al. | |
| 6,493,609 B2 | 12/2002 | Johnson | |
| 6,552,669 B2 | 4/2003 | Simon et al. | |
| 6,675,095 B1 | 1/2004 | Bird et al. | |
| 6,681,158 B2 | 1/2004 | Griffith et al. | |
| 6,795,772 B2 | 9/2004 | Lin et al. | |
| 6,799,094 B1 | 9/2004 | Vaida et al. | |
| 6,820,006 B2 * | 11/2004 | Patera | 701/301 |
| 6,873,903 B2 | 3/2005 | Baiada et al. | |
| 6,885,313 B2 | 4/2005 | Selk, II et al. | |
| 6,950,037 B1 | 9/2005 | Clavier et al. | |
| RE39,053 E | 4/2006 | Rees | |

(Continued)

FOREIGN PATENT DOCUMENTS

FR    2810146 A1    12/2001

(Continued)

OTHER PUBLICATIONS

PCT Intl Search Report and Written Opinion for Application No. PCT/US2008/081881, dated Jul. 3, 2009, 15 pgs.

(Continued)

*Primary Examiner* — Thomas Black
*Assistant Examiner* — Marthe Marc-Coleman
(74) *Attorney, Agent, or Firm* — Caven & Aghevli LLC

(57) ABSTRACT

A separation management system includes a data input module for receiving and filtering aircraft information and airspace information related to a control aircraft and a relevant aircraft, the aircraft information enabling the calculation of a trajectory window for each aircraft. A conflict monitoring module may be included in the system for monitoring the trajectory window for each aircraft with respect to time and probabilistic location, the conflict monitoring module determining when a trajectory overlap occurs resulting from the intersection of the trajectory window for the control aircraft and the relevant aircraft. In addition, the system may include a separation routing module for rerouting the control aircraft when a trajectory overlap for the control aircraft is detected by the conflict monitoring module.

20 Claims, 7 Drawing Sheets

U.S. PATENT DOCUMENTS

| | | | |
|---|---|---|---|
| 7,024,309 B2 | 4/2006 | Doane | |
| 7,136,016 B1 | 11/2006 | Swensen et al. | |
| 7,194,353 B1 | 3/2007 | Baldwin et al. | |
| 7,212,917 B2 | 5/2007 | Wilson, Jr. | |
| 7,306,187 B2 | 12/2007 | Lavan | |
| 7,492,307 B2 | 2/2009 | Coulmeau | |
| 7,516,014 B2 | 4/2009 | Hammarlund et al. | |
| 7,630,829 B2 | 12/2009 | Pepitone | |
| 2002/0133294 A1 | 9/2002 | Farmakis et al. | |
| 2002/0152029 A1 | 10/2002 | Sainthuile et al. | |
| 2003/0122701 A1 | 7/2003 | Tran | |
| 2003/0193409 A1 | 10/2003 | Crank | |
| 2004/0078136 A1 | 4/2004 | Cornell et al. | |
| 2004/0193362 A1 | 9/2004 | Baiada et al. | |
| 2005/0156777 A1 | 7/2005 | King et al. | |
| 2006/0224318 A1* | 10/2006 | Wilson et al. | 701/213 |
| 2007/0078600 A1* | 4/2007 | Fregene et al. | 701/301 |
| 2007/0150127 A1 | 6/2007 | Wilson, Jr. et al. | |
| 2010/0121574 A1 | 5/2010 | Ariyur et al. | |

FOREIGN PATENT DOCUMENTS

| | | |
|---|---|---|
| JP | 10285099 | 10/1998 |
| RU | 2176852 | 12/2001 |
| WO | WO0041153 | 7/2000 |
| WO | WO0065373 A2 | 11/2000 |

OTHER PUBLICATIONS

Chang et al, "Collision Avoidance for Multiple Agent Systems", 42nd IEEE Conf on Decision and Control, Dec. 2003, vol. 1, pp. 539-543.

Hill et al., "A Multi-Agent System Architecture for Distributed Air Traffic Control", AIAA Guidance, Navigation and Control Conf, Aug. 2005, 11 pgs.

Livadas et al., "High-Level Modeling and Analysis of the Traffic Alert and Collision Avoidance System (TCAS)", Proceedings of the IEEE, vol. 88, No. 7, Jul. 2000, pp. 926-948.

Mejia et al, "Safe Trajectory Tracking for the Two-Aircraft System", 2007 IEEE Intl Conf on Electro/Information Technology, May 2007, pp. 362-367.

Schouwenaars et al., "Decentralized Cooperative Trajectory Planning of Multiple Aircraft with Hard Safety Guarantees", AIAA Guidance, Navigation and Control Conf, Aug. 2004, 14 pgs.

Stipanovic et al., "Cooperative Avoidance Control for Multiagent Systems", submitted as an invited paper for the ASME Journal of Dynamic Systems, Measurements and Control special issue on Multi-Agent Systems 2006, vol. 129, Sep. 2007, pp. 699-707.

* cited by examiner

AUTOMATED SEPARATION MANAGER

TECHNICAL FIELD

The disclosure relates to systems and methods for vehicle separation management and routing and, more particularly, to systems and methods for time-based automated airspace separation management and air vehicle routing in an information-centric net-enabled environment.

BACKGROUND

Controlling assets or vehicles operating in a defined space is a task that has both civilian and military applications. In a common situation, air traffic control may involve moving commercial airplanes through airspace. Civilian air traffic control and military aircraft (asset or vehicle) tasking include the coordinated movement of multiple aircraft (assets or vehicles) through a crowded space filled with terrain, weather, and other obstructions. Aircraft may include both manned and unmanned aerial vehicles (UAV).

In practice, traditional methods of airspace separation management are usually geared to operating in a voice-based procedural control airspace environment, typically including geographical boundaries to separate potentially conflicting aircraft from one another. These methods may generally rely on rigid procedures and traffic patterns to maintain safety under the large latencies and uncertainties that necessarily exist in a voice based system.

The current methods generally include highly structured airspace routing plans that are created after intensive planning. The large number of aircraft managed in the airspace makes the structured plans complex. Therefore, the structured plans may not easily handle large scale on-line disruptions. In extreme situations, an entire portion of airspace may be cleared during an airspace disruption as a precautionary measure, which in some cases unnecessarily disrupts aircraft routed along otherwise predictable flight paths.

Other airspace management methods include reactive collision avoidance and may be used in conjunction with the structured plans. For example, potential or impending conflicts may be handled by short term collision avoidance measures using a human controller or automated collision avoidance system (ACAS) methods. However, short term collision avoidance may not be effective within an airspace shared by UAVs or when structured plans experience large scale disruptions.

Generally speaking, traditional airspace management methods may benefit from improved flexibility and by taking a reactive approach to collision avoidance resulting in a reduced density of aircraft in the airspace. As implemented, the traditional approach may become overburdened with increased density when the preplanned routes become disrupted. Accordingly, there is need for improved techniques that create flexibility and more effective use of airspace when routing aircraft.

SUMMARY

Embodiments of methods and systems for providing separation management of vehicles are disclosed. Embodiments may advantageously increase an aircraft density of airspace while creating more flexibility for establishing routes through airspace while avoiding conflicts and disruptions In an embodiment, a method for maintaining a safe separation distance between vehicles includes receiving time-referenced position and state data for vehicles including a control vehicle and a relevant vehicle, the vehicles having initial locations within a time-space zone of interest. Maneuver characteristics for the vehicles may be determined within the time-space zone of interest. A probabilistic position zone for each vehicle may be calculated within the time-space zone of interest for a plurality of time intervals, the probabilistic position zone based on a received time-referenced position, speed and direction data, the vehicle maneuver characteristics, and attitude data. The control vehicle may be rerouted when the distance between the probabilistic position zone of the control vehicle is less that a specified distance from the probabilistic position zone of the relevant vehicle. A reference point may be selected for the control vehicle when the control vehicle is rerouted. A plurality homotopically distinct paths may be calculated between the time-referenced position of the control vehicle and the reference point based on the maneuvering characteristics of the control vehicle and the probable probabilistic position zone of interest for the vehicles.

In another embodiment, a separation management system includes a data input module for receiving and filtering aircraft information and airspace information related to a control aircraft and a relevant aircraft, the aircraft information enabling the calculation of a trajectory window for each aircraft. A conflict monitoring module may be included in the system for monitoring the trajectory window for each aircraft with respect to time and probabilistic location, the conflict monitoring module determining when a trajectory overlap occurs resulting from the intersection of the trajectory window for the control aircraft and the relevant aircraft. In addition, the system may include a separation routing module for rerouting the control aircraft when a trajectory overlap for the control aircraft is detected by the conflict monitoring module.

In yet another embodiment, a method includes generating a virtual predictive radar (VPR) screen including a plurality of trajectory paths for a control vehicle, the plurality of trajectory paths originating at an initial point and ending at a destination point, the VPR including time rings predicting the location of the control vehicle in 3-D space on the VPR. A plurality of constraints on the VPR may be created for the control vehicle based on the maneuverability characteristics and velocity of the control vehicle. At least one relevant vehicle may be located proximate one of the time rings of the VPR, the relevant vehicle creating a conflict along at least one of the plurality of trajectory paths. A homotopy route may be generated along a subset of the plurality of trajectory paths to enable the control aircraft to maintain a safe separation between the control vehicle and the relevant vehicle when the control vehicle traverses from the initial point to the destination point.

The features, functions, and advantages can be achieved independently in various embodiments of the present invention or may be combined in yet other embodiments.

BRIEF DESCRIPTION OF THE DRAWINGS

Structures and techniques in accordance with various exemplary embodiments of the present invention are described in detail below with reference to the following drawings. As used herein, the term "exemplary" identifies an example and not necessarily an ideal.

DETAILED DESCRIPTION

Overview

Methods and systems for providing a separation manager are described herein. Many specific details of certain embodiments of the present invention are set forth in the following description and in FIGS. 1 through 7 to provide a thorough understanding of such embodiments. One skilled in the art, however, will understand that the present disclosure teaches various additional embodiments, or that one or more embodiments of the present invention may be practiced without several of the details described in the following description.

Current airspace management methods are not able to adequately take advantage of current data communications and networking capabilities. Increased situation awareness, situation analysis, speed of action, and flexibility that can be gained through networking and computational capability is not realized by current methods. Therefore, network centric and information centric systems, methods, processes, and techniques are described herein to provide improved airspace separation.

Generally speaking, the disclosure describes various embodiments of a separation manager configured in an information centric environment including network-enabled data transmission capabilities. Embodiments of the present invention may be implemented in one or more physical environment, including a maritime, space, or ground environment. For example, the automated separation manager may be used with one or more aircraft in an airspace, maritime vessels in a maritime environment, ground vehicles on in a ground environment, and/or space platforms in space. Although embodiments may be implemented in various environments, the separation manager will be described in an airspace environment including various aircraft, as one of many possible. As used herein, the term "aircraft" is intended to include airplanes, unmanned areal vehicles (UAVs), missiles, ordinance, gliders, helicopters, and other objects that travel thorough airspace. Based on the disclosure, a person of ordinary skill would be able to use the separation manager in other environments.

Figure 1:
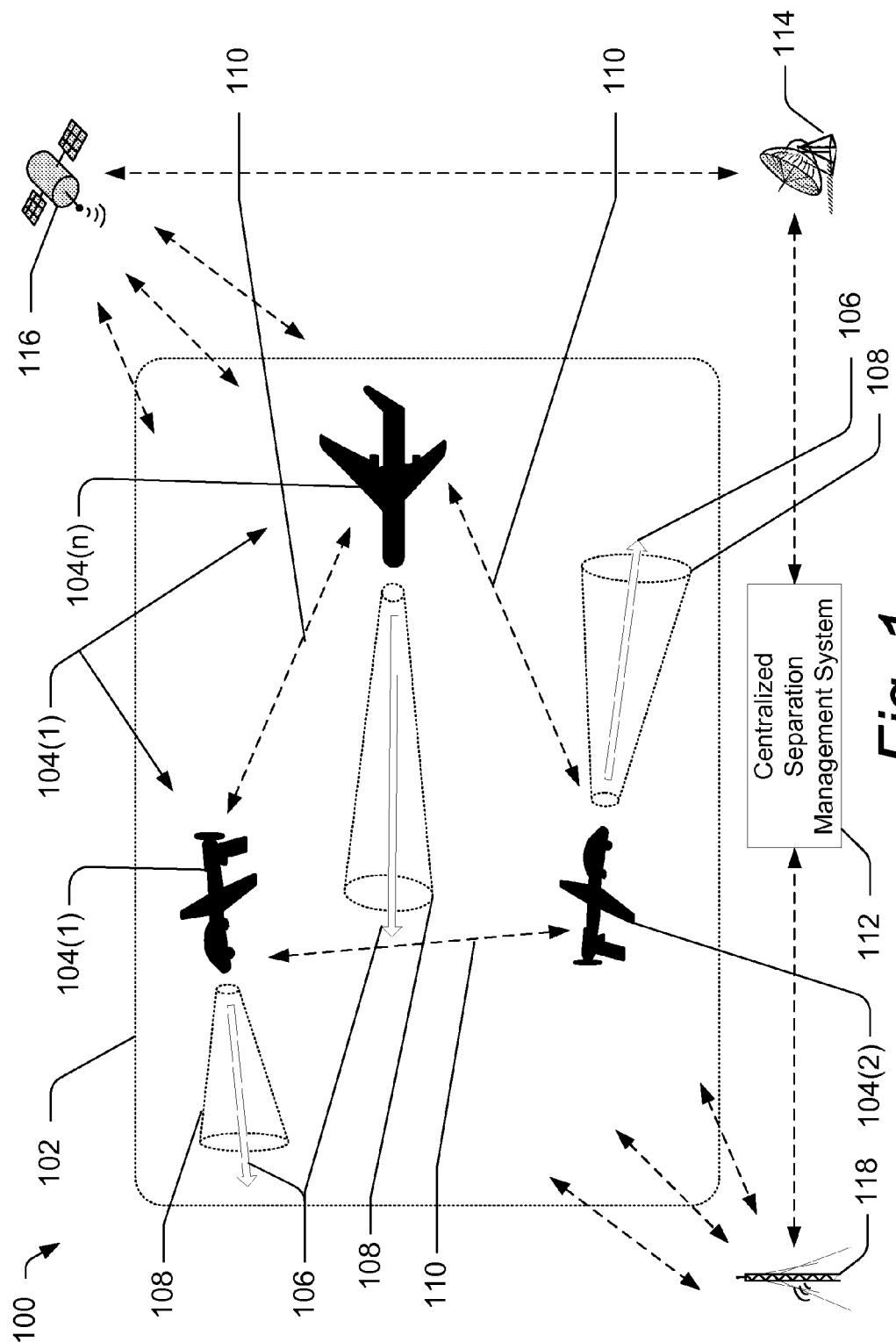
FIG. 1 is a schematic view of an illustrative environment including aircraft in communication with at least one of other aircraft or ground based systems, the aircraft configured with a separation manager in accordance with an embodiment of the present invention.

FIG. 1 is a schematic view of an environment 100 including aircraft in communication with at least one of other aircraft or ground based systems, the aircraft configured to perform techniques provided by a separation manager in accordance with an embodiment of the present invention. The environment 100 includes an airspace 102 with a number of aircraft 104. The aircraft 104 may include manned aerial vehicles and/or unmanned aerial vehicles (UAV) employed in military use, commercial use, or private use, or any combination thereof. The aircraft 104 each include a trajectory path 106 in a trajectory window 108 of possible trajectories. In one implementation, the separation manager may cycle through each of the aircraft 104, such as aircraft 104(1), 104(2), 104 (n), checking for conformance to commands from the separation manager and for potential conflicts. The separation manager may continually update commands to adjust for deviations and/or to maintain an optimally controlled environment.

In some embodiments, the separation manger may be configured as distributed system where each aircraft may implement the separation manager, or a portion thereof, and may compile data, analyze, and provide separation management to surrounding aircraft via inter-aircraft communications 110. For example, the first aircraft 104(1) may communicate the trajectory path 106 associated with the first aircraft to the second aircraft 104(2). The second aircraft 104(2) may process the first aircraft's trajectory path 106, the trajectory window 108, or other data related to or communicated from the first aircraft, such as velocity, acceleration, and altitude for processing by the separation manager. The quality of the data exchanged between the aircrafts, either directly or indirectly, may influence decision making processes by the separation manager. The separation manager implemented by the second aircraft 104(2) may generate a separation window for the second aircraft to enable the second aircraft to avoid a predefined airspace adjacent to the first aircraft 104(1) at a future point in time (when a potential conflict would have been present). In other embodiments, the aircraft may communicate to each other thorough intermediaries, such as a satellite or an antenna 118, which may relay transmissions from a first aircraft to a second aircraft.

Alternatively or additionally, a centralized separation management system 112 may implement the separation manager for the aircraft 104. In such an instance, the centralized separation management system 112 may communicate with the aircraft 104 using satellite systems, including a ground based transceiver 114 and the satellite 116. The aircraft 104 may include satellite transceiver (not shown) to facilitate communications with the satellite 116 to exchange data with the centralized separation management system 112. Other communication configurations may be implemented, such as a radio based communication system using the antenna 118, or other communication techniques. The centralized separation management system 112 may compile aircraft data, analyze the data, and provide separation management to the aircraft 104. In some embodiments, the centralized separation management system 112 uses techniques for separating aircraft according to time based allocation of the airspace 102, among other techniques, which will be more thoroughly described below.

Alternatively or additionally, aircraft implementing the separation manager may provide a centralized separation management system component with route options. The centralized system may choose final separation routes for the aircraft, which are communicated to the aircraft in accordance with an implemented communications configuration. Additionally, the centralized system component may carry out separation for those aircraft not configured with a separation manager.

In one implementation, the separation manager may use aircraft flight management system (FMS) data as a source for aircraft location and behavior and may use additional airspace/aircraft related information when it is available. A subset of functionality can be obtained by working with data obtained from sources such as radar, sonar, optical, or infrared sources. In some embodiments, the separation manager continually monitors aircraft for potential conflicts. In addition or alternatively, the separation manager may improve airspace configuration by sending aircraft control commands to modify aircraft trajectories. The separation manager may be fully automated or include human interaction and/or oversight to the separation manager processes. In addition, by using a subset of separator functionality, operation of the separation manager may be applicable to traditional radar and sense and avoid systems.

Figure 2:
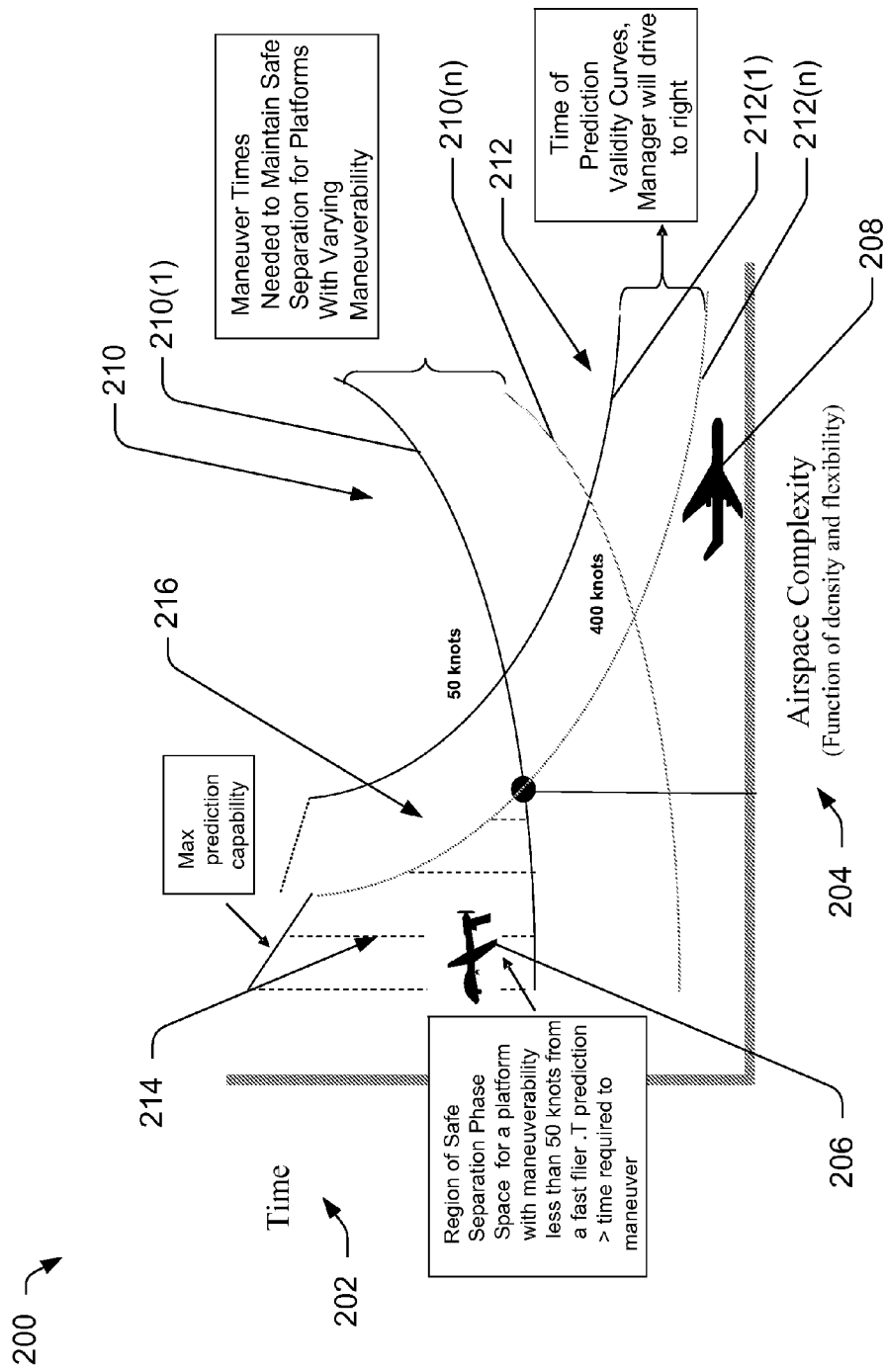
FIG. 2 is an illustrative chart depicting a relationship between time and airspace complexity used to determine a safe separation region of phase space, which may be increased by implementation of an automated separation manager in accordance with an embodiment of the present invention.

FIG. 2 is an illustrative chart 200 depicting a relationship between time 202 and airspace complexity 204 used to determine a safe separation phase space which may be increased by implementation of an automated separation manager in accordance with an embodiment of the present invention. The chart 200 includes information for two aircraft, such as a control aircraft 206 and a relevant aircraft 208. The control aircraft 206 is an aircraft that may be "controlled" or otherwise maneuvered to create a safe separation distance from the relevant aircraft 208. Although descriptions herein may be limited to the control aircraft 206 and the relevant aircraft 208, it should be understood that the separation manager may be configured to provide airspace separation management for any number of aircraft in a substantially simultaneous process. For instance, the control aircraft may consider the trajectory of many relevant aircraft when determining a safe trajectory through a portion of airspace.

The chart 200 may include maneuver curves 210 which depict the time necessary to maintain a safe separation distance between the aircraft 206, 208. The control aircraft may include varying degrees of maneuverability and speed. For example, a first maneuver curve 210(1) may be plotted for the control aircraft 206 having a first velocity, such as a velocity of 50 knots. A second maneuver curve 210(n) may be plotted on the chart 200 and indicate a second velocity, such as 400 knots, of the aircraft 206. In addition, the chart includes predication time curves 212 that determine the time necessary for initiating maneuvers to maintain the safe separation distance between the aircraft 206, 208. For example, using current airspace management techniques, the prediction time curve 212(1) and maneuver curve 210(1) may determine a safe preparation phase space 214 in which the control aircraft 206 may successfully maneuver to maintain a safe separation from the relevant aircraft 208. Implementation of embodiments of the present invention may shift the prediction curve to the right to create the new prediction curve 212(n), thus expanding the safe preparation phase space 214 by an additional safe space 216. Accordingly, a shift from the maneuver curve 210(1) to the maneuver curve 210(n) may further expand the safe zone. As shown, implementation of embodiments of the present invention may enable an increase in airspace density and/or flexibility of aircraft travel through the airspace.

Figure 3:
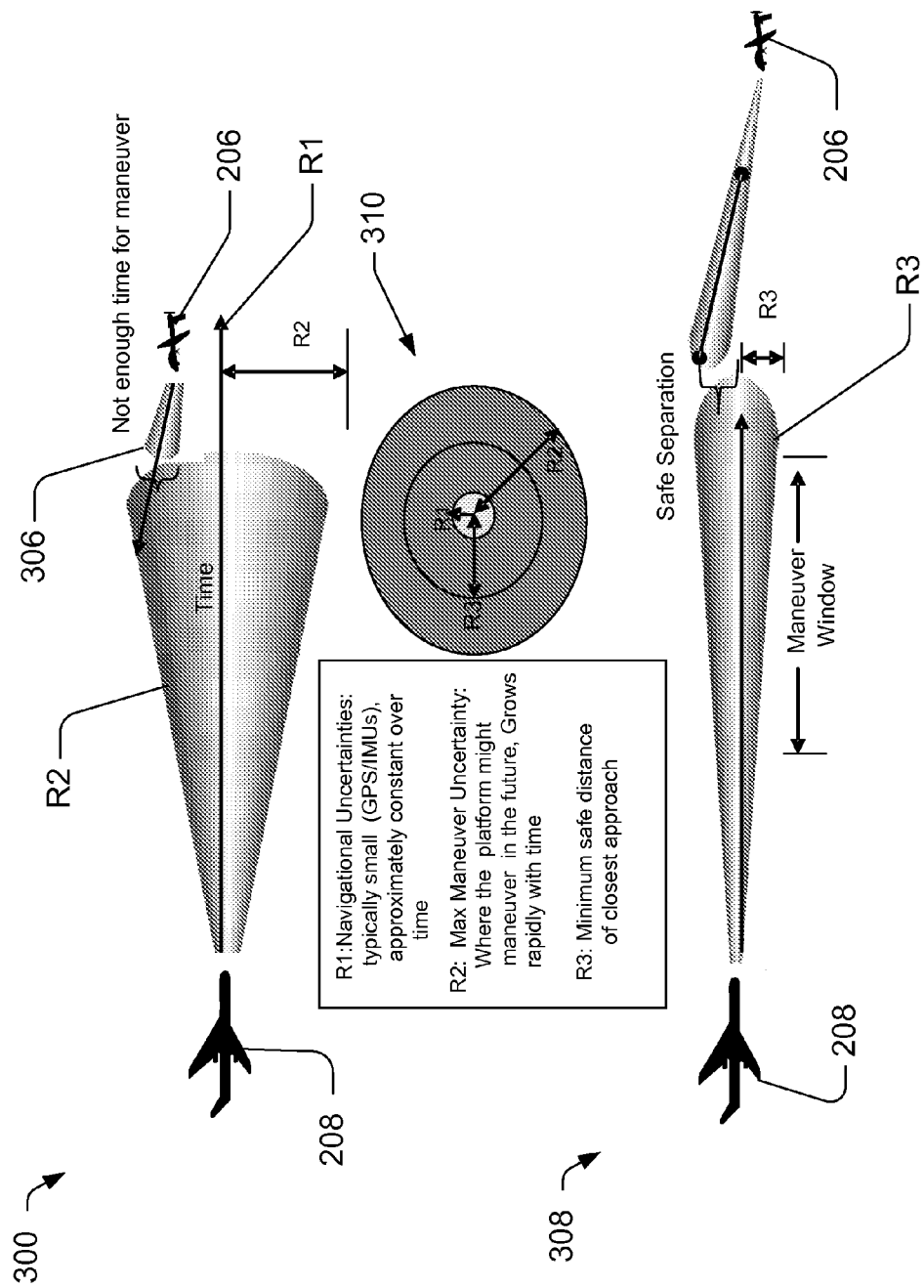
FIG. 3 is a schematic view showing illustrative safe separation windows for aircraft with varying degrees of uncertainty in accordance with another embodiment of the present invention.

FIG. 3 is a schematic view showing illustrative safe separation windows for aircraft with varying degrees of uncertainty in accordance with another embodiment of the present invention. A first safe separation window 302 includes the relevant aircraft 208 and the control aircraft 206, each having a trajectory window. The relevant aircraft includes a trajectory window R1 that represents the navigational uncertainty from a planned trajectory path 304. The trajectory window R1 may be a result of environmental conditions (e.g., wind, air mass, etc.) instrumentation limitations and/or tolerances, or other factors influencing aircraft trajectory. The navigational uncertainties represented by the subset trajectory window R1 308 are typically small and may be assumed to be approximately constant over time. The control aircraft includes a control trajectory window 306.

A second trajectory window R2 is defined by the possible trajectories of the control aircraft 208 as a function of time, where the radius (R) of the trajectory represents distance from a straight path. For example, a maneuverable aircraft may have a very large R2 because the aircraft may be able to execute a sharp maneuver in a relatively short distance whereas a less maneuverable aircraft may have a narrower R2 value. Generally speaking, R2 values define the maximum maneuvering uncertainty for an aircraft and the R2 area characteristically grows rapidly with time.

Implementations of the present invention may reduce the R2. In some implementations, the separation manager addresses the use of the R's (R1, R2, and R3 described herein) in maintaining airspace separation and thus enlarge potential safe separation zones between the control aircraft 206 and the relevant aircraft 208. For example, techniques may use probability curves to reduce the trajectory window R2 to a minimum safe distance trajectory window R3 illustrated in a second safe separation window 308. For example, the trajectory window R3 may represent a ninety-eight percent confidence interval for the trajectory of the relevant aircraft 208. In some implementations, a greater or smaller control window confidence interval may be appropriate, which may vary across applications, such as military applications during a conflict and commercial flight implementations where risk avoidance is an utmost concern for the separation management system.

As shown in the first safe separation window 302, the control aircraft trajectory window 306 does not allow the control aircraft enough time to maneuver to avoid the maximum maneuver uncertainty trajectory window R2. In such an instance, the control aircraft 206 and the relevant aircraft 208 may be at a high risk for collision. In contrast, the second safe separation window 308 does not include an intersection of the trajectory window 306 and the trajectory window R3, therefore creating a safe separation distance between the two aircraft. Embodiments of the present invention use a trajectory window R3 for relevant aircraft when implementing the separation manager to control the airspace. For reference, examples of the R1, R2, and R3 are illustrated in chart 310. However, one skilled in the art will appreciate the radius of R1, R2, and R3 may greatly differ from the chart 310, although the general relationship of R2 being greater than R3 is consistent. Further detail about an illustrative separation manager will be described in the subsequent section, followed by details of illustrative modules of the separation manager and operations thereof.

Illustrative Separation Manager

Figure 4:
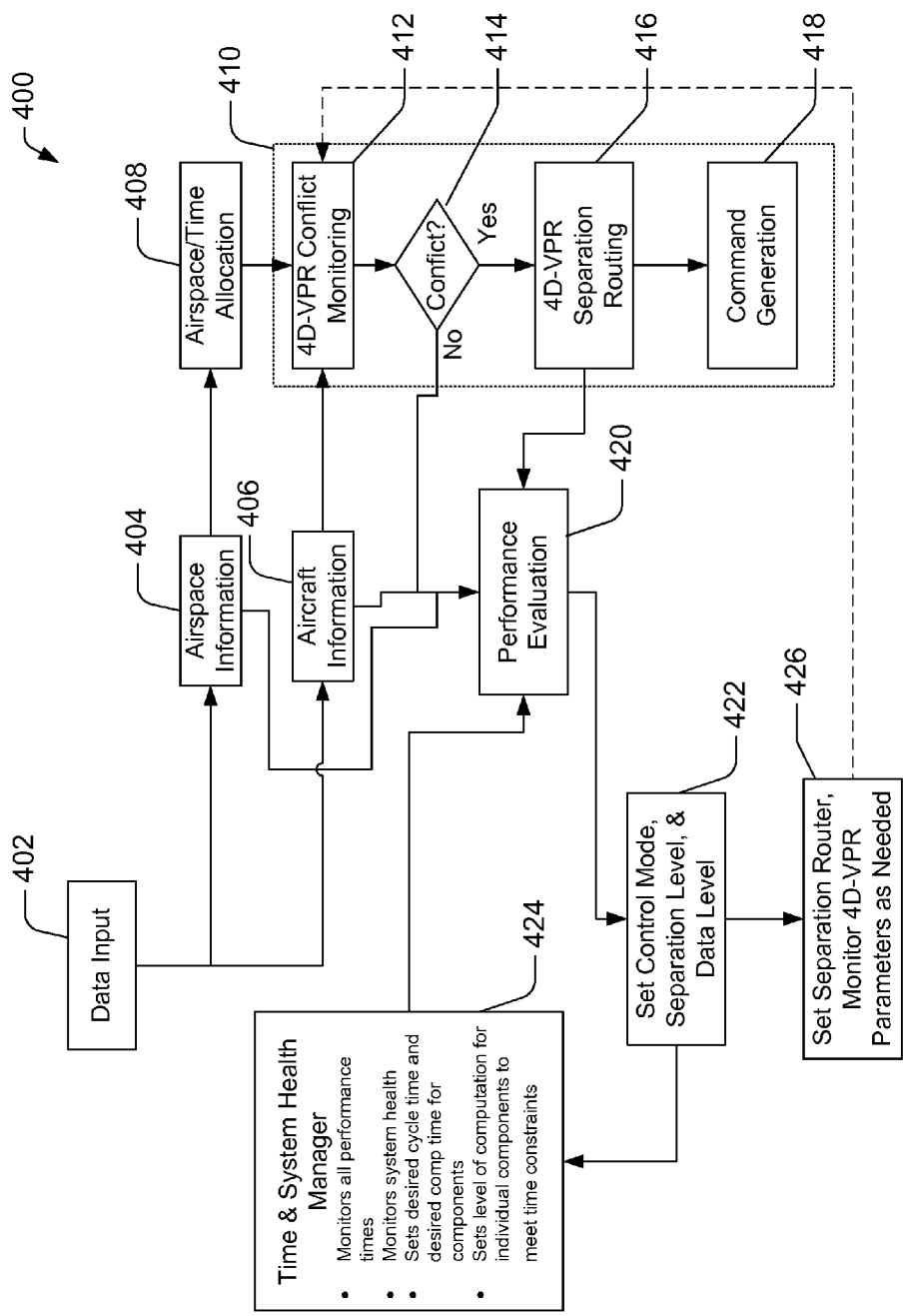
FIG. 4 is a flow diagram of an illustrative configuration of a separation manager in accordance with an embodiment of the present invention.

FIG. 4 is a flow diagram of an illustrative configuration of a separation manager 400 in accordance with an embodiment of the present invention. As shown, the separation manager 400 includes plurality of operations represented as blocks in the flow diagram. In implementation, the separation manager 400 may include fewer or more operations to implement embodiments of the present invention.

Embodiments include data input 402 from an aircraft. The data input 402 may include any data related to the relevant aircraft and/or the control aircraft, such as information from a flight management system (FMS) of an aircraft, such as trajectory, altitude, velocity, flight plan data, information from sensors, or other data related to the aircraft, including environment info such as restricted regions, external threats, weather. The data input 402 may be continually updated for the aircraft, such as at a rate of 10 Hz. In other implementations, the data input 402 may be updated more or less frequently. An update rate can be dynamically adjusted depending on factors such as airspace complexity, aircraft behavior and type, signal space conditions. In instances where the data input 402 is not updated, such as instances where data is not received or the data is determined to be corrupt, the input data for the next cycle may be generated from the data of the previous cycle. The data input 402 may be preformatted and/or post formatted for used by the separation manager 400. For example, additional processes may convert information from the FMS to usable data which may be used by the separation manager 400 to create a safe separation between the relevant aircraft, such as relevant aircraft 208, and the control aircraft, such as control aircraft 206. In addition, distinct data structures may be generated for low bandwidth implementations to expedite transmission to other aircraft and/or controllers. In addition, data may include intention flags from a pilot or a mission planner. Data may include data from the relevant vehicle.

In accordance with some embodiments, the separation manager 400 may include airspace information 404 and aircraft information 406. The airspace information 404 may include metrics for the airspace, including geographical information and other data related to the airspace. Airspace information may also include metrics such as airspace complexity, density, aircraft mix, and knowledge certainty level which can be used in setting parameters such as desired data update rate, separator cycle time, and other separation manager parameters. The airspace information 404 may include designations, such as combat, commercial use, and the like, which may be used to determine the R2 value such as by increasing or decreasing a confidence interval value associated with the airspace information 404.

The aircraft information 406 may include performance metrics related to the aircraft. In addition, the aircraft information may include predictions, latency information, data processing information (e.g., formatting, bandwidth, etc.), behavior metrics, and location information (e.g., FMS derived data). For example, the aircraft information 406 may enable the separation manager to create the trajectory window R2 using information specific to a particular aircraft or type of aircraft. The aircraft information 406 may identify an aircraft as a military fighter jet aircraft, such as an F-15 Eagle. The identified aircraft may have known flight characteristics which may be used to generate the trajectory window R2. Predictions may include typical trajectory information associated with the identified aircraft, including historical information. For example, some identified aircraft may typically fly relatively direct paths despite having a relatively high maneuverability potential. Behavioral metrics may include information on the status of an aircraft, such as a status of in-transit, dog-fight, attack, pursuit, or other status. The status of the aircraft may influence the size of the trajectory window R2.

The separation manager 400 may use the airspace information 404 to generate an airspace/time allocation 408 which may determine an aircraft's current airspace allocation region relative to other aircraft. An airspace allocation region is a dynamically changing region surrounding the aircraft that no other aircraft may enter for safety or other reasons. For example, in a friendly (non-combat situation), the airspace/time allocation 408 for an aircraft may be larger than the airspace/time allocation during a combat situation when greater risks may be necessary to achieve a successful outcome to a planned mission.

In accordance with one embodiment, the separation manager 400 uses the aircraft information 406 and/or airspace/time allocation 408 as inputs for a separation routing process 410. The separation routing process 410 includes a virtual predictive radar (VPR) with a variety of dimensions. The dimensions may include time, altitude, latitude, and/or longitude. For illustrative purposes, the separation routing process will be presented as a 4D-VPR, including all four dimensions (4D), however other dimensions may be added or removed while effectively implementing the separation manager 400 with a VPR.

As an overview, the separation routing process 410 includes a 4D-VPR conflict monitoring module 412 which receives data from the aircraft information 406 and/or the airspace/time allocation 408. The conflict monitoring module 412 may search for upcoming potential conflicts with other aircraft by processing inputs to determine if a future conflict is possible. For example, the conflict monitoring module 412 may determine if the trajectory of the relevant aircraft 208 provides a safe separation from the control aircraft 408 at a future point in time, such as 10 seconds in the future.

In one implementation, the conflict monitoring module 412 may include a look-ahead time. The look-ahead time may be implemented as a step function over a look-ahead time window for determining time points to check for possible future conflicts. In addition or alternatively, a region extent function may determine which aircraft to consider in checking for possible upcoming conflicts. For example, aircraft in a close proximity may be sampled more often than aircraft further from the control aircraft 206. There may be different regions used for checking conflict with different aircraft types. The shape of the region considered may depend upon the control aircraft course and behavior of the aircraft. Finally, the regions may depend upon airspace conditions, such as density and complexity.

As discussed above, a cycle time, such as without limitation 100 Hz to 0.5 Hz, determines how often to invoke the conflict monitoring module 412. The cycle time may be static in some instances or it may be dynamically varied based upon current circumstances such as airspace density, local region aircraft behavior, or types of aircraft in the region.

Thus far conflicts have been typically associated with other aircraft. However, further embodiments may include other possible threats to a control aircraft such as poor weather or dangerous regions, such as regions heavily fortified with armament such as surface to air missiles (SAM). In still further embodiments, the conflict monitoring module 412 may assess likely position of the aircraft based on possible control of the aircraft determined by space and time, such as via the look-ahead window. For example, there may be a minimal conflict approach distance function which keeps the control aircraft from making a premature trajectory change. In addition, the conflict monitoring module 412 may depend on other factors such as relative aircraft type/capability, absolute aircraft type/capability, relative aircraft behavior, and/or absolute aircraft behavior, and/or time into the future (time ahead along the proposed reroute). Factors such as aircraft behavior and type/capability affect the look-ahead time used in checking for potential conflicts. For example, a slow UAV checking for potential conflicts with a highly capable fast flying F-15 would use a longer look-ahead window than if it were checking for potential conflicts with an aircraft of similar capability and behavior.

If a safe separation exists, there may be no further action by the conflict monitoring module 412 related to relevant aircraft, thus the separation manager 400 may cycle to another aircraft to implement conflict monitoring, such as using a 10

Hz processing cycle. However, if the conflict monitoring module 412 determines a potential conflict may occur based on the trajectory window R2 and/or R3 for the relevant aircraft 408 and the trajectory of the control aircraft 406, then the separation manager 400 may determine at a decision block 414 to proceed to a 4D-VPR separation routing module 416.

In one embodiment, the separation routing module 416 may modify the trajectory of the control aircraft to prevent a possible future conflict or achieve a desired goal, including conflicts, avoidance situations, or action such as without limitation airspace, adverse weather, or making desired trajectory modifications. The separation routing may include a number of possible modes. In one mode, the routing for an aircraft may be based on ownership of the relevant aircraft. For example, if the relevant aircraft is friendly, the safe subset may be enlarged to provide more maneuvering flexibility for the control aircraft. In a second mode, multiple possible conflicts may occur for the routed aircraft over the routing time, whereas all the possible conflicts may be avoided in a routing. In a third mode, routing may involve simultaneous choices for multiple aircraft among outputs created for individual aircraft. Finally, routing may involve simultaneous choices for multiple aircraft where outputs are created concurrently for the aircraft.

The separation routing module 416 may include techniques to determine a set of routing possibilities using one or more metrics to determine route preferences. The route may consist of one or more preferred routes, a discrete set of route options weighted according to preference, and/or a continuum of route options with a weighting function. Routing may end at a specified point in space, such as a target destination. In some instances, a time window for arrival at the target destination may be used. A specified speed, heading, and pitch at the target destination may also be specified.

As discussed above, metrics may be included in the separation routing module 416. The metrics may include metrics to measure deviation from original planned route (in time, space, and behavior). Other metrics may measure deviation from linear constant speed motion, measure nearness in time and space to other aircraft, measure threat conditions of traversed airspace, measure certainty level of information on conditions of traversed airspace, and/or measure impact of higher level mission objectives.

The separation routing module 416 may include a minimal separation approach distance function as a constraint that may not be violated. The minimal separation approach distance may depend on relative aircraft type, absolute aircraft type, relative aircraft behavior, and/or absolute aircraft behavior. In addition, the minimal separation approach distance may depend upon time into the future (time ahead along the proposed reroute). The separation routing module 416 may include a minimal time to minimal separation distance.

The separation routing process 410 may lead to a command generation 418 for the controlled aircraft, the relevant aircraft, or other aircraft in the proximate airspace of aircraft evaluated by the separation manager 400. The output of command generation 418 may be a trajectory window, trajectory path, trajectory options, or a no-fly command (airspace to avoid). Additionally, the command generation 418 may format command output in accordance to requirements of the intended recipient.

Additional operations may be included in the separation manager such as a performance evaluation 420, a control mode module 422, a time and system health manager 424, and/or setup implementation module 426. The control mode module 422 will be discussed in further detail.

In accordance with an embodiment of the separation manager 400, the setup module 422 includes control mode options. The control mode options may contain a level of automation which further includes avoidance rules. For example avoidance rules may be determined on whether a vehicle is manned or unmanned (UAV). Avoidance rules may include having the UAV avoid the manned aircraft, a mutual avoidance rule between the UAV and the manned aircraft, a human controller providing some guidance to the UAV regarding avoidance, and/or the UAV entering a safe-hold pattern. In addition, control mode options may contain a level of centralization (e.g., ground based), distribution (e.g., aircraft based) or a hybrid of centralization and distribution.

The setup module 422 may include varying separation levels. For example, a separation level may contain a minimal allowed approach distance along with a minimal time to approach. The minimal time to approach and approach distance may be a function of airspace conditions, aircraft behavior and capability, and/or objectives. Further, the setup module 422 may include data levels such as a data level update rate where various rates for different data types or data fields are implemented. A data level may contain a send rate for different data types or data fields. In addition, a data level may contain the 'sophistication' level of data requested, for example for specific sensors, predicted trajectories, pilot provided flags, aircraft internal sensors, and mission plan information. Finally, the setup module 422 may include an airspace and time allocation technique. The technique may include an allocation of airspace surrounding the control aircraft that other aircraft are not allowed to traverse. This may depend on relative aircraft capability and/or behavior, other aircraft capability and/or behavior, and the identity of particular aircraft and/or mutual mission objectives.

Illustrative Separation Router (4D-VPR Module)

Figure 5:
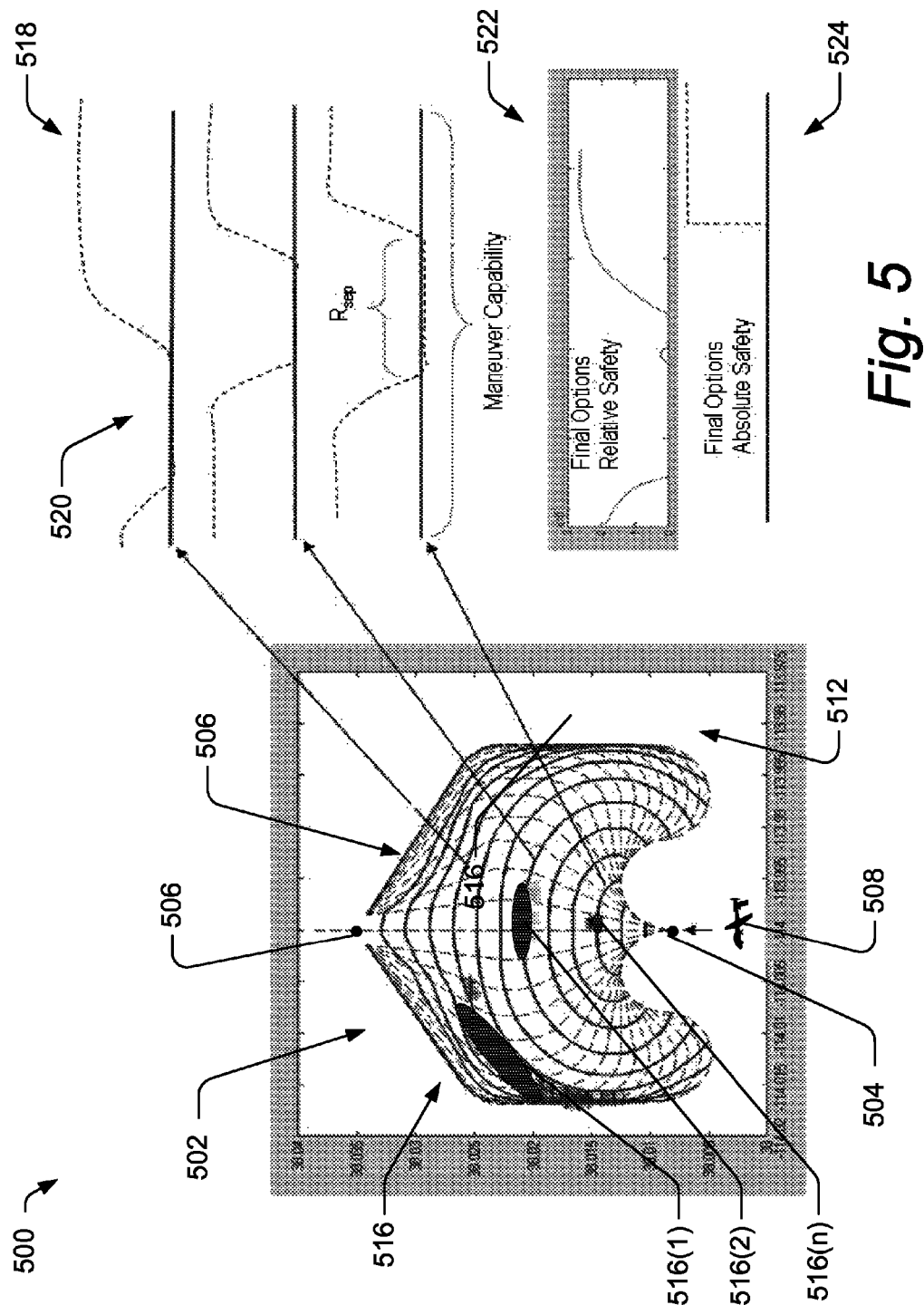
FIG. 5 is a schematic of an illustrative virtual predictive radar that depicts aircraft trajectory with respect to time as implemented by a separation manager in accordance with yet another embodiment of the present invention.

FIG. 5 is a schematic of an illustrative virtual predictive radar (VPR) 500 that depicts aircraft trajectory with respect to time as implemented by a separation manager in accordance with yet another embodiment of the present invention. More specifically, the separation routing process 410 creates a 4D-VPR model 502. The 4D-VPR 502 includes the four dimensions of time, latitude, longitude, and altitude, however more or fewer dimensions may be used to generate the VPR 500. In some embodiments, there may be a discrete set of altitude levels specified with a distinct 'sub' VPR for each altitude and a set of altitude transition guides. Generally speaking, the separation router determines reroute options for a control aircraft by (1) generating a discrete frame work of trajectories and 'time-range rings;' (2) determining a weight for framework; and (3) routing the trajectories through intervening regions as efficiently as possible using the framework as a guide or by extending the weighting. A scale component determines the scale of the discrete frame work using information on certainty of airspace conditions, complexity of the airspace, and type of aircraft in the area.

In one embodiment, a method for maintaining a safe separation time and distance between vehicles includes receiving a time-referenced position, speed and direction (attitude) data for vehicles including a control vehicle, the vehicles having initial locations within a predetermined zone. Data describing maneuvering characteristics of the vehicles and information on mission plan may be received. In addition, pilot generated intentions may be assessed and incorporated in some embodiments. For each of a plurality of future time intervals, a potential time-position zone is calculated for each vehicle within the predetermined zone based on the received time-referenced position, speed and direction data, and vehicle maneuver characteristics. If the distance between the potential time-position zones for the vehicles is less than a specified distance, the control vehicle is rerouted. A reference point is selected as a next waypoint for the control vehicle. A plurality of homotopic regions are calculated between the initial location of the control vehicle and a destination point. The destination point is generated based on the maneuvering characteristic data for the control vehicle and potential time/position zones of each vehicle within the predetermined zone. Within each homotopy region, a set of path options is determined between the initial location of the control vehicle and the reference point based on the maneuvering characteristic data for the control vehicle. In other embodiments, methods may forego homotopy paths and instead find routes directly from guide curves.

When using the homotopy paths, the guide curves determine the time rings. Homotopy paths are typically constrained by the time rings, and aircraft capability and/or desired behavior, but are not constrained by the guide curve. In some implementations, the time rings may be generated using constraints on desired aircraft performance. The time rings may be determined by a future location of the aircraft at a future point in time given desired constraints on aircraft motion. The time rings are drawn as lines on the picture but in actuality they are "fattened" rings with variable "diameter."

In some embodiments, the 4D-VPR 502 may include an initial reference point 504 (starting point) and an objective point 506, which is the desired destination of a control aircraft 508. The control aircraft 508 may reach the objective point 506 by traveling along any number of trajectory paths 510, which are represented by dashed lines in FIG. 5 that originate at the initial reference point 504 and continue through a three-dimensional representation plus time, thus a 4D representation, to the objective point 506. The trajectory paths incorporate maneuverability of the control aircraft 508 and mission objectives, and therefore create a no-fly zone 512 that is outside the 4D-VPR trajectory paths 510. The VPR 500 includes time rings 514 that indicate the amount of time necessary for the control aircraft 508 to travel along a particular trajectory path 510. The time rings 514 are analogous to radar range rings except the time rings represent time rather than distance.

In some embodiments, the 4D-VPR 502 includes representations of potential conflicts in the form of trajectory windows 516, described above as R3 trajectory windows, which are confidence regions for a predictive aircraft position of another aircraft. Typically, only potentially conflicting aircraft will be represented on the 4D-VPR and will affect the trajectory path 510 of the control aircraft 508. Other conflicts and/or obstacles, such as weather conditions or geographical constraints (e.g., a mountain) may be represented on the 4D-VPR.

Working in the context of time and considering the R3 trajectory windows 516 in relation to maneuver capability enable management of separation distances between aircraft. The 4D-VPR 502 provides a technique to link time, maneuverability, and R3 in determining possible reroutes for the control aircraft 508 to avoid possible conflicts based on the maneuvering capabilities of the control aircraft. A high uncertainty of future conditions may result in a short time frame representation of objects with high future uncertainty on the 4D-VPR 502. A high airspace complexity or high speed aircraft may necessitate a fine scale frame work having many time rings 514.

The location of the R3 trajectory window 516 across one of the time rings 514 determines a probability distribution over the time ring. The probability distributions may be used along with additional probability distributions induced by any number of metrics defined over time rings. For simplicity, the 4D-VPR 502 does not depict additional metrics however additional metrics may be included in further embodiments in accordance with the present invention. A weight may be determined by metrics specified by a metric component. Metric evaluations are approximations with the fineness of approximation determined by the scaling. Metrics may include a deviation from an original path metric, a time deviation metric, a behavior change metric, and/or a behavior deviation metric. The metric values may describe a worst case, average case, weighted average case.

With continued reference to FIG. 5, reverse distributions 518 may be generated by the separation routing process 410 for any number of the time rings 514. In particular, the reverse distribution may include weighted graphs showing separation as a function of confidence along the array of possible trajectories. A first distribution 518(1) depicts a low confidence interval at a dip 520 which indicates a potential conflict in this region, a subset of trajectory paths 510. The dip 520 is associated with the R3 trajectory window 516(1) that is the potential conflict requiring airspace separation. The right side of the graph depicts an increased confidence level which indicates less threat of a conflict or no conflict. Similarly, graph 518(2) corresponds to the R3 trajectory window 516(2) while graph 518(*n*) corresponds to the R3 trajectory window 516(*n*). Each time ring 514 represented along the distribution graphs 518 are adjusted to show possible ranges of the threats. The distributed graphs 518 represent 'unrolled' time rings 514 that are normalized for comparison purposes, therefore enabling a determination of safe trajectory paths for the control aircraft 508 to safely reach the objective point 506.

The distribution graphs 518 may be multiplied or otherwise combined to create a final options relative safety graph 522. The relative magnitude of the final options relative safety graph 522 indicates an increasing safety of a particular trajectory both represented by that portion of the graph. The final options relative safety graph 522 may be converted to a final options absolute safety graph 524 which indicates trajectory paths which are deemed acceptable (denoted by the higher line on the right of the graph) and trajectory paths that are deemed unsafe (denoted by the a line with no magnitude on the graph). In some instances, no mutually feasible direction for a reroute may be depicted on the graph without the using additional turns from one of the trajectory paths 510, such as an instance where the control aircraft 508 jumps trajectory paths to avoid a conflict.

The functionality of the separation manager results from the use of input streaming data and fast cycle rate along with techniques to quickly generate trajectory options and efficiently obtain approximate metric evaluations, and quick iterative inspection and continual refinement of trajectories. In addition a subset of functionality may be obtained through traditional radar or 'sense and avoid' data input. Further aspects of the separation router will be described in relation to an illustrative operation in the subsequent section.

Illustrative Separation Router Operation

Figure 6:
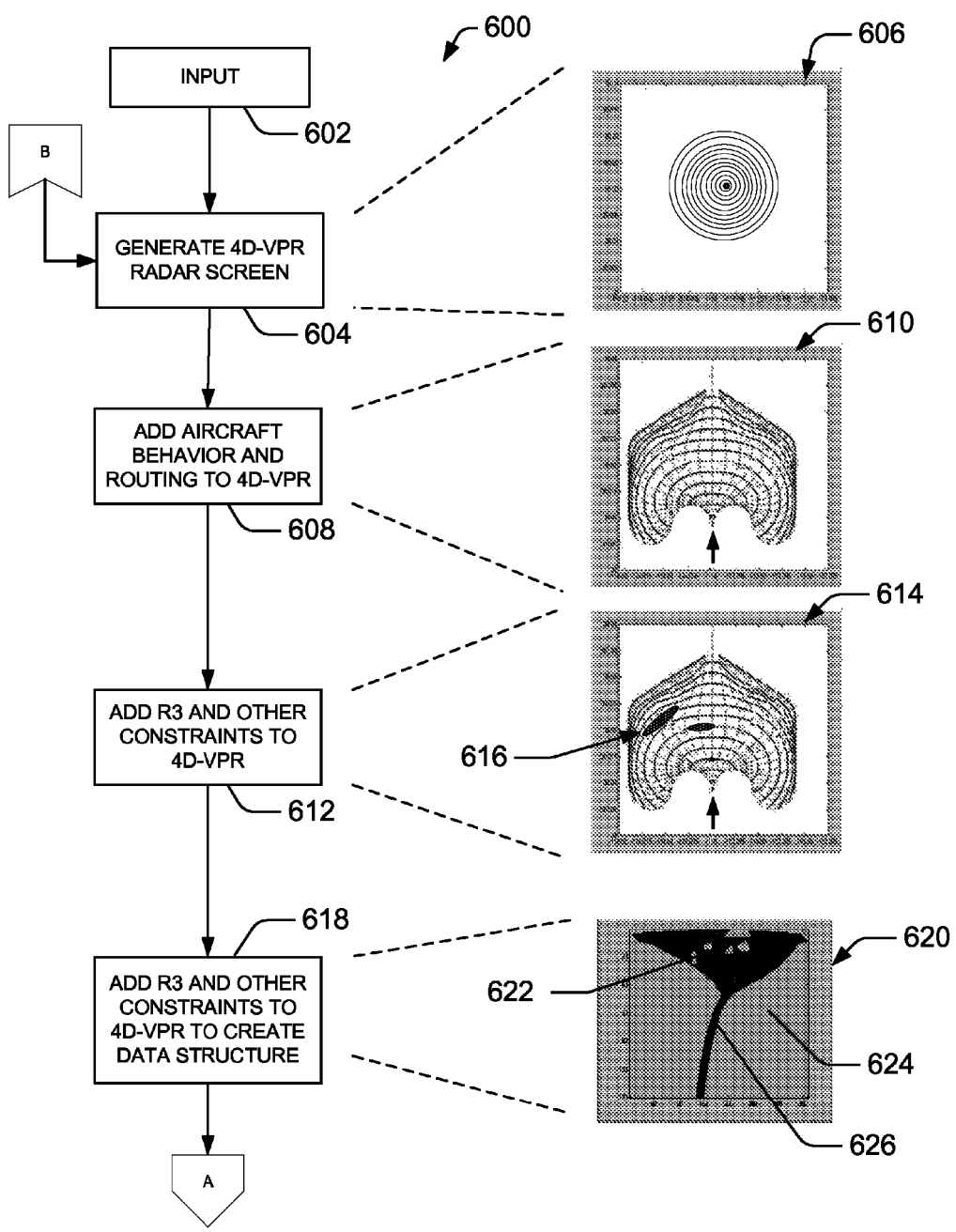
FIG. 6 is a flow diagram of the illustrative virtual predictive radar in accordance with another embodiment of the present invention.
Figure 7:
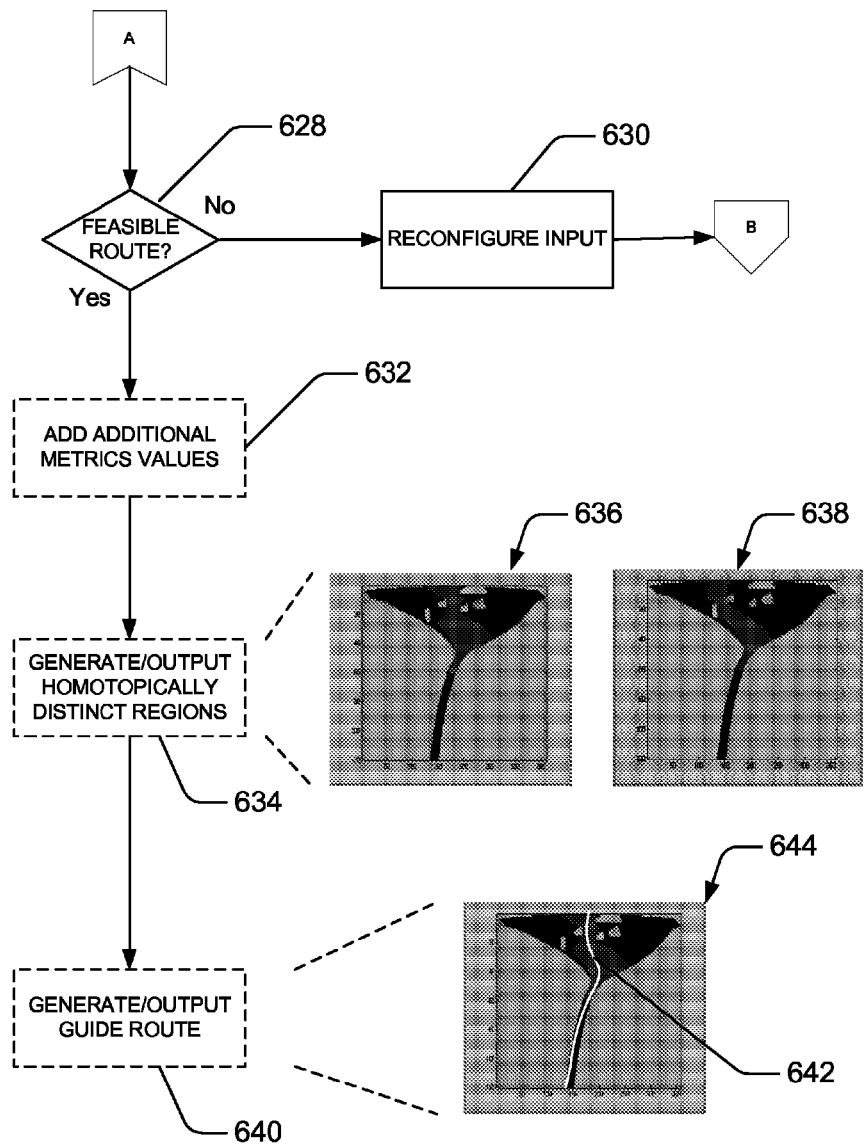
FIG. 7 is a flow diagram including of additional illustrative details of the flow diagram in FIG. 6.

FIGS. 6 and 7 are flow diagrams of an illustrative process 600 of the virtual predictive radar in accordance with another embodiment of the present invention. FIGS. 6 and 7 include an arrangement of blocks arranged in a logical flow diagram, the blocks representing one or more processes conducted by the separation manager. In some embodiments, the blocks may be implemented in software and execute by a processor. The arrangement of the blocks is not intended as a limitation. In some implementations, the blocks may be executed in series or in parallel.

The process 600 includes an input 602 which may include the data input 402, information from the airspace information 404, and/or aircraft information 406. The input is received at 604 for generating a 4D-VPR radar screen 606. The illustrative (default) radar screen 606 may be generated in association with the 4D-VPR from the block 604, where the rings represent elapsed time from an initial reference point. Next, aircraft behavior and routing information may be added to the 4D-VPR at 608 and is represented by a populated 4D-VPR display 610 which includes time rings and trajectory paths.

In accordance with one or more embodiments, the separation manager via the separation router adds R3 trajectory windows and other constraints (e.g., conflict sources) to the 4D-VPR at 612. A populated 4D-VPR and R3 display 614 includes three R3 trajectory windows 616 representing potential conflicts. Next, R3 and other constraints are added to the 4D-VPR data to create a data structure display 620. In some implementations, the data structure display 620 includes conflicts 622 (generated form R3 potential conflicts), a no-fly zone 624 which may be based in part on the control aircraft's maneuverability, and a available travel route 626.

The separation router process 600 continues in FIG. 7 at 628 where a decision block determines if a feasible route is determined by the separation router. If no feasible route is determined, the input of the separation manager may be reconfigured at 630 and the process may begin again at 604 to create another trajectory determination. For example, the input may be reconfigured by reducing the confidence intervals used in the final options relative safety, or other metrics that create the route display 620.

In one or more embodiments, the separation router may optionally include additional metrics values at 632, including confidence intervals or other metrics which expand or narrow the route display 620. Next, homotopically distinct regions are generated at 634 for specific trajectory routes that may enable the control aircraft 508 to traverse from the initial point of reference 504 to the objective point 506 while maintaining a safe separation from conflicts. For example, a first trajectory path 636 may include a more direct homotopic region while a second trajectory path 638 may include a less direct homotopic region for the control aircraft 508 to reach the objective point 506. The homotopically distinct regions may be output for use to a pilot, controller, UAV, or for other uses in accordance with the present invention.

In accordance with one or more embodiments of the present invention, the separation manager and/or the separation router may be configured to generate and/or output a guide route, such as a preferred route 642 depicted in the route display 644. For example, in an implementation where the control aircraft 508 is a manned aerial vehicle, a guide route may not be necessary but may provide a more efficient route for the pilot to consider, among many other considerations. In an implementation where the control aircraft 508 is a UAV, the UAV may be automatically directed along the preferred route 642 without further action by a controller. Therefore, the UVA may be directed along a route providing a safe separation from a relevant aircraft, such as a fast flying fighter jet, therefore providing a safe separation and conflict free airspace proximate the control aircraft 508 and the fighter jet.

Although only local airspace separation management was described for illustrative purposes, one skilled in the art would understand that many aircraft in a densely populated airspace may be controlled using the separation manager implementing a separation router as described herein. The separation manager, whether implemented in a centralized or disparate net-centric implementations, may assess aircraft and conflict interaction on a wide scale to create safe separation distances for the aircraft.

While preferred and alternate embodiments have been illustrated and described, as noted above, many changes can be made without departing from the spirit and scope of the present invention. Accordingly, the scope of the present invention is not limited by the disclosure of these preferred and alternate embodiments. Instead, the scope of the present invention should be determined entirely by reference to the claims that follow.

What is claimed is:

1. A method for maintaining a safe separation distance between vehicles, comprising:

receiving time-referenced position and state data for vehicles including a control vehicle and a relevant vehicle, the vehicles having initial locations within a time-space zone of interest;

determining maneuver characteristics for the vehicles within the time-space zone of interest;

calculating a probabilistic position zone for each vehicle within the time-space zone of interest for a plurality of time intervals, the probabilistic position zone based on a received time-referenced position, speed and direction data, the vehicle maneuver characteristics, and attitude data;

rerouting the control vehicle when the distance between the probabilistic position zone of the control vehicle is less that a specified distance from the probabilistic position zone of the relevant vehicle;

selecting a reference point for the control vehicle when the control vehicle is rerouted; and calculating a plurality of homotopically distinct paths between the time-referenced position of the control vehicle and the reference point based on the maneuvering characteristics of the control vehicle and the probabilistic position zone of interest for the vehicles.

2. The method of claim 1, wherein receiving time-referenced position and state data for vehicles, the referenced state data includes speed, direction, and attitude data.

3. The method of claim 1, wherein receiving time-referenced position and state data for vehicles includes at least one of a mission control generated intentions or data from vehicle control surface sensors.

4. The method of claim 1, wherein calculating a plurality homotopically distinct paths between the time-referenced position of the control vehicle and the reference point includes a latency of the time-referenced position.

5. The method of claim 1, wherein a portion of the time referenced position and state data is based on at least one of data from sensors located on one of the vehicles or data from sensor located off-board the vehicles.

6. The method of claim 1, further comprising creating one or more four dimensional virtual predictive radar (4D-VPR) to facilitate a reroute of the control aircraft, the 4D-VPR including a number of time rings, each time ring corresponding to a set of probable locations of the control vehicle at the time ring.

7. The method of claim 6, wherein the 4D-VPR includes indications of intersections the relevant vehicles on the time rings, the 4D-VPR further including a set of homotopically distinct regions of travel for the control aircraft.

8. A separation management system, comprising:
a data input module for receiving and filtering aircraft information and airspace information related to a control aircraft and a relevant aircraft, the aircraft information enabling the calculation of a trajectory window for each aircraft;
a conflict monitoring module for monitoring the trajectory window for each aircraft with respect to time and probabilistic location, the conflict monitoring module determining when a trajectory overlap occurs resulting from the intersection of the trajectory window for the control aircraft and the relevant aircraft; and
a separation routing module for:
calculating a plurality homotopically distinct paths between the control vehicle and a reference point based on the maneuvering characteristics of the control vehicle and a probabilistic position zone of interest for the control aircraft and the relevant aircraft; and
rerouting the control aircraft along one of the plurality of homotically distinct paths when a trajectory overlap for the control aircraft is detected by the conflict monitoring module.

9. The system of claim 8, further comprising an airspace allocation module receiving input from the airspace information and providing data to the conflict monitoring module, the airspace allocation module dynamically determining time-space zones for aircraft that must not be traversed by other aircraft.

10. The system of claim 9, wherein the airspace allocation module analyzes a quality of the aircraft information and the airspace information, the trajectory window modified based on the quality of information.

11. The system of claim 10 where the quality of the aircraft information and the airspace information includes a data sampling rate that is requested for each aircraft, the data sampling rate initiating a refreshment of data used by the data input module.

12. The system of claim 8, wherein the control aircraft is an unmanned aerial vehicle (UAV).

13. The system of claim 8, wherein the separation routing module is configured to generate a four dimensional virtual predictive radar (4D-VPR) representation including a plurality of trajectory paths for the control aircraft from an initial point to a destination point, the 4D-VPR including the trajectory paths with reference to altitude, latitude, and longitude, the 4D-VPR having time rings along the plurality of trajectory paths to represent a predicted time for a future location of the control aircraft.

14. The system of claim 13 wherein a computer media 4D-VPR is generated and configured to store method routing information, time ring, and probabilistic predicted trajectory locations.

15. A method, comprising:
generating a virtual predictive radar (VPR) screen including a plurality of trajectory paths for a control vehicle, the plurality of trajectory paths originating at an initial point and ending at a destination point, the VPR including time rings predicting the location of the control vehicle in 3-D space on the VPR;
creating a plurality of constraints on the VPR for the control vehicle based on the maneuverability characteristics and velocity of the control vehicle;
locating at least one relevant vehicle proximate one of the time rings of the VPR, the relevant vehicle creating a conflict along at least one of the plurality of trajectory paths; and
generating a homotopy route along a subset of the plurality of trajectory paths to enable the control aircraft to maintain a safe separation between the control vehicle and the relevant vehicle when the control vehicle traverses from the initial point to the destination point.

16. The method of claim 15, further comprising converting the time ring with a conflict to a relative safety graph including confidence interval data, the relative safety graph depicting relative safety levels for the trajectory paths from the initial point to the destination point for the control aircraft.

17. The method of claim 16, wherein the relative safety graph is converted to an absolute safety graph which depicts trajectory routes having a confidence interval above a predetermined threshold.

18. The method of claim 15, wherein generating a homotopy route includes generating one or more guide routes for the control vehicle, the guide routes creating a safe separation from the relevant vehicle residing along one of the plurality of trajectory paths on the VPR.

19. The method of claim 18, further comprising selecting a preferred guide route from the one or more guide.

20. The method of claim 19, wherein the preferred guide route is transformed to one or more commands configured to control the control aircraft along the preferred guide route from the initial point to the destination point.

* * * * *